United States Patent
Sun et al.

(10) Patent No.: US 8,903,245 B2
(45) Date of Patent: Dec. 2, 2014

(54) OPTICAL RADIATION SIGNAL GENERATING DEVICE AND TRANCEIVING SYSTEM, AND METHOD OF GENERATING AN OPTICAL RADIATION SIGNAL

(75) Inventors: Nai-Hsiang Sun, Kaohsiung (TW); Jung-Sheng Chiang, Kaohsiung (TW); Wen-Fung Liu, Kaohsiung (TW); Shih-Chiang Lin, Kaohsiung (TW); Gary A. Evans, Kaohsiung (TW); Jerome K. Butler, Kaohsiung (TW)

(73) Assignee: I-Shou University, Kaohsiung (TW)

( * ) Notice: Subject to any disclaimer, the term of this patent is extended or adjusted under 35 U.S.C. 154(b) by 293 days.

(21) Appl. No.: 13/460,482

(22) Filed: Apr. 30, 2012

(65) Prior Publication Data

US 2013/0287408 A1    Oct. 31, 2013

(51) Int. Cl.
*H04B 10/00*    (2013.01)

(52) U.S. Cl.
USPC .......................................... 398/128; 398/135

(58) Field of Classification Search
CPC .................................................. H04B 10/1141
USPC ......................................................... 398/128
See application file for complete search history.

(56) References Cited

U.S. PATENT DOCUMENTS

| | | | | |
|---|---|---|---|---|
| 6,195,162 | B1 * | 2/2001 | Varnham et al. | 356/478 |
| 8,170,424 | B2 * | 5/2012 | Cai | 398/201 |
| 8,384,977 | B2 * | 2/2013 | Sun et al. | 359/238 |
| 8,428,467 | B2 * | 4/2013 | Sun et al. | 398/127 |
| 2007/0273958 | A1 * | 11/2007 | Hirooka et al. | 359/327 |
| 2011/0135313 | A1 * | 6/2011 | Sun et al. | 398/142 |
| 2012/0194892 | A1 * | 8/2012 | Sun et al. | 359/238 |
| 2013/0287408 | A1 * | 10/2013 | Sun et al. | 398/149 |

OTHER PUBLICATIONS

Sun et al; Second-order fiber Bragg gratings; 2009; IEEE.*
Nai-Hsiang Sun et al; Second-order fiber Bragg gratings; 2009; IEEE.*

* cited by examiner

*Primary Examiner* — Ken Vanderpuye
*Assistant Examiner* — Amritbir Sandhu
(74) *Attorney, Agent, or Firm* — Jianq Chyun IP Office

(57) ABSTRACT

A method of generating an optical radiation signal is to be implemented by an optical radiation signal generating device including a dual beam generating unit for receiving an original optical input signal, and a second-order fiber Bragg grating (FBG). The dual-beam generating unit is configured to generate, from the original optical input signal, first and second optical input signals having a phase difference therebetween. The second-order FBG is configured to receive the first and second optical input signals, and to radiate an optical radiation signal by interference between the first and second optical input signals.

7 Claims, 4 Drawing Sheets

OPTICAL RADIATION SIGNAL GENERATING DEVICE AND TRANCEIVING SYSTEM, AND METHOD OF GENERATING AN OPTICAL RADIATION SIGNAL

BACKGROUND OF THE INVENTION

1. Field of the Invention

This invention relates to a wireless signal generating device, a wireless signal transceiving system, and a method of generating a wireless signal, more particularly to an optical radiation signal generating device, an optical radiation signal transceiving system, and a method of generating an optical radiation signal.

2. Description of the Related Art

In fiber optic communication, an electrical signal carrying information to be transceived is first converted into an optical signal by an electrical-to-optical transducer, and then, the optical signal is transmitted via an optical fiber cable to a receiver. Afterwards, the optical signal is converted back into an electrical signal carrying the information.

However, it is necessary to physically connect the receiver to an output terminal of the optical fiber cable for receiving the optical signal. Therefore, it is relatively inconvenient for a user using the receiver to receive the optical signal since the mobility of the receiver is limited.

SUMMARY OF THE INVENTION

Therefore, an object of the present invention is to provide a method of generating an optical radiation signal, an optical radiation signal generating device, and an optical radiation signal transceiving system capable of transceiving optical signals wirelessly.

According to an aspect of this invention, a method of generating an optical radiation signal is to be implemented by an optical radiation signal generating device. The optical radiation signal generating device includes a dual-beam generating unit for receiving an original optical input signal and a second-order fiber Bragg grating (FBG). The method comprises the following steps of: a) configuring the dual-beam generating unit to generate, from the original optical input signal, first and second optical input signals, which have a phase difference therebetween, according to a control signal; and b) configuring the second-order FBG to receive the first and second optical input signals, and to radiate an optical radiation signal, which is to be received by a wireless receiver, by interference between the first and second optical input signals.

According to another aspect of this invention, an optical radiation signal generating device comprises a duel-beam generating unit and a second-order FBG. The dual-beam generating unit is for receiving an original optical input signal and a control signal. The dual-beam generating unit is operable to generate, from the original optical input signal, first and second optical input signals, which have a phase difference therebetween, according to the control signal. The second-order FBG is connected to the dual-beam generating unit for receiving the first and second optical input signals. The second-order FBG is operable to radiate an optical radiation signal produced by interference between the first and second optical input signals.

According to still another aspect of this invention, an optical radiation signal transceiving system comprises an optical radiation signal generating device, and a wireless receiver. The optical radiation signal generating device includes a dual-beam generating unit for receiving an original optical input signal and a control signal, and a second-order FBG. The dual-beam generating unit is operable to generate, from the original optical input signal, first and second optical input signals, which have a phase difference therebetween, according to the control signal. The second-order FBG is connected to the dual-beam generating unit for receiving the first and second optical input signals. The first and second optical input signals interfere with each other to produce an optical radiation signal radiated by the second-order FBG. The wireless receiver is for receiving the optical radiation signal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
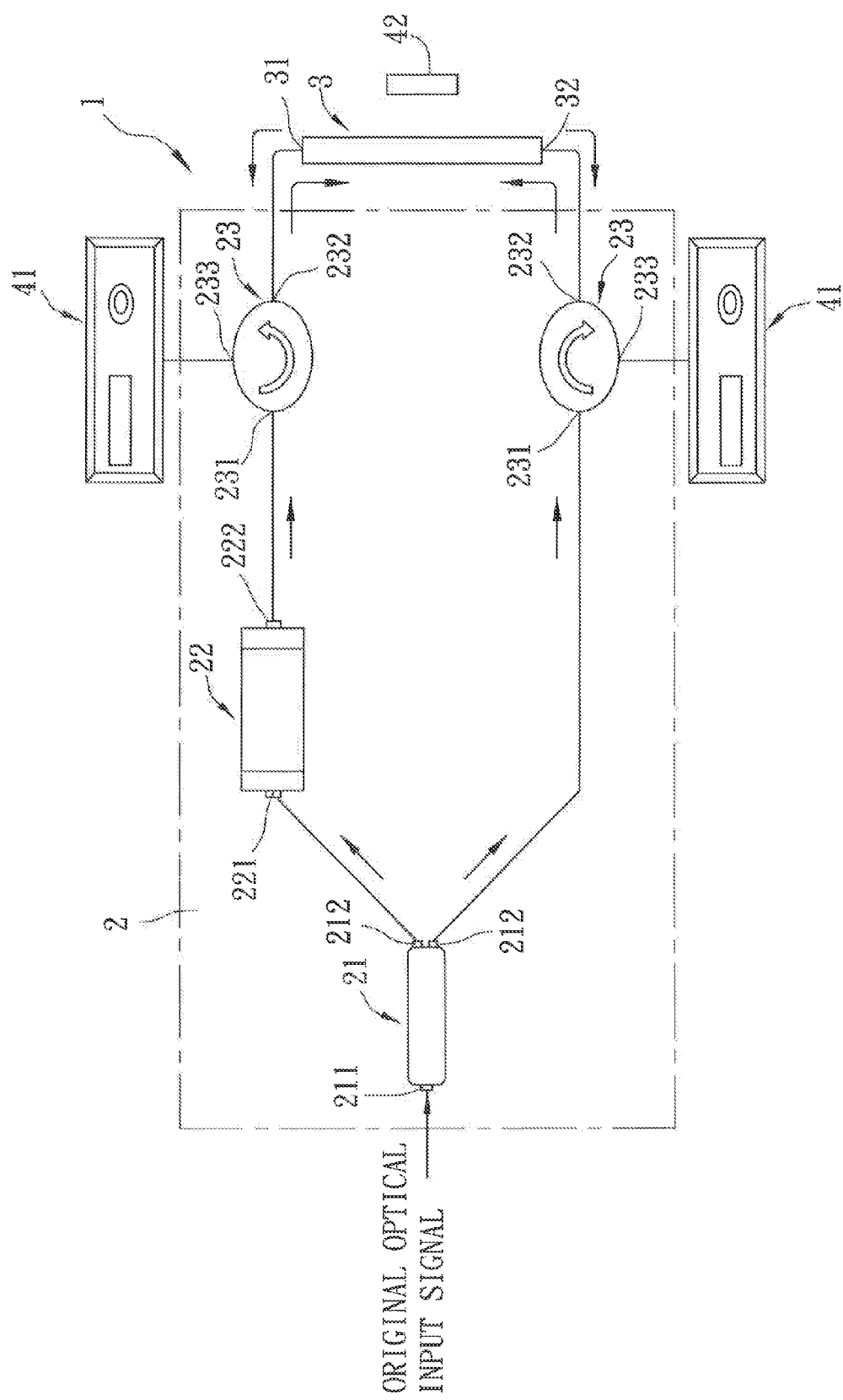
FIG. 1 is a schematic diagram of a preferred embodiment of an optical radiation signal transceiving system according to the present invention.

Referring to FIG. 1, the preferred embodiment of an optical radiation signal transceiving system according to the present invention is shown to comprise an optical radiation signal generating device 1 including a dual beam generating unit 2 and a second-order fiber Bragg grating (FBG) 3, and a wireless receiver 42.

The dual beam generating unit 2 includes an optical splitter 21, a phase shifter 22, and two optical circulators 23. The optical splitter 21 has an input terminal 211 and two output terminals 212, and is operable to receive an original optical input signal through the input terminal 211, to split the original optical input signal into first and second optical signals that have equal output power, and to output the first and second optical signals through the output terminals 212, respectively. In this embodiment, the optical splitter 21 is, but not limited to, a −3 dB coupler.

The phase shifter 22 is coupled to one of the output terminals 212 of the optical splitter 21, and has an input end 221 and an output end 222. The input end 221 connected to said one of the output terminals 212 via an optical fiber for receiving the first optical signal therefrom. The phase shifter 22 is operable to receive a control signal and to shift phase of the first optical signal according to the control signal so as to output a phase-shifted first optical signal through the output end 222. The control signal may be a direct current voltage or an alternating current voltage, and a phase difference between the phase-shifted first optical signal and the second optical signal corresponds to the control signal. In this embodiment, the phase shifter 22 is made of a piezoelectric material.

The optical circulators 23 are operable to receive the phase-shifted first optical signal and the second optical signal, and to output first and second optical input signals based on the phase-shifted first optical signal and the second optical signal, respectively. Specifically, each of the optical circulators 23 has a first port 231, a second port 232, and a third port 233. One of the optical circulators 23 is disposed adjacent to and connected to the output end 222 of the phase shifter 22 through the first port 231 thereof via an optical fiber for receiving the phase-shifted first optical signal. The other one of the optical circulators 23 is connected to the other one of the output terminals 212 of the optical splitter 21 that is not connected to the phase shifter 22 through the first port 231 thereof via another optical fiber for receiving the second optical signal. The second ports 232 of the respective optical circulators 23 are operable to output the first and second optical input signals based on the phase-shifted first optical signal and the second optical signal, respectively.

The second-order FBG 3 includes opposite first and second ends 31, 32 connected to the second ports 232 of the optical circulators 23 via optical fibers for receiving the first and second optical input signals therefrom, respectively. The second-order FBG 3 is operable to radiate an optical radiation signal produced by interference between the first and second optical input signals, and is operable to generate first and second optical output signals according to the first and second optical input signals.

More specifically, the second-order FBG 3 produces interference between the first and second optical input signals when the wavelengths of the first and second optical input signals correspond to Bragg wavelength of the second-order FBG 3 (i.e., a resonant wavelength) conforming with a grating period expressed as $$\Lambda = 2\pi/\beta,$$

where $\Lambda$ represents the grating period of the second-order FBG 3, and $\beta$ denotes a propagation constant.

The first optical output signal consists of a reflected portion of the first optical input signal that is reflected by the second-order FBG 3, and a transmitted portion of the second optical input signal that is transmitted through the second-order FBG 3. Similarly, the second optical output signal consists of a reflected portion of the second optical input signal that is reflected by the second-order FBG 3, and a transmitted portion of the first optical input signal that is transmitted through the second-order FBG 3. Additionally, the first and second optical output signals are emitted respectively from the first and second ends 31, 32 along an imaginary line extending from the first end 31 to the second end 32, and the optical radiation signal is radiated in a radial direction perpendicular to the imaginary line.

The wireless receiver 42 of the transceiving system is operable to receive the optical radiation signal. In this embodiment, the wireless receiver 42 is, but not limited to, a portable optical power meter having an aperture with relatively large diameter for receiving the optical radiation signal.

Additionally, the optical circulators 23 are operable to receive the first and second optical output signals through the second ports 232 thereof, and to output the first and second optical output signals through the third ports 233 thereof, respectively.

For example, the optical radiation signal generating device 1 of the present invention can be disposed on a ceiling of a room, and a user may use the wireless receiver to access the information carried by the original optical input signal by measuring output power of the optical radiation signal.

Figure 2:
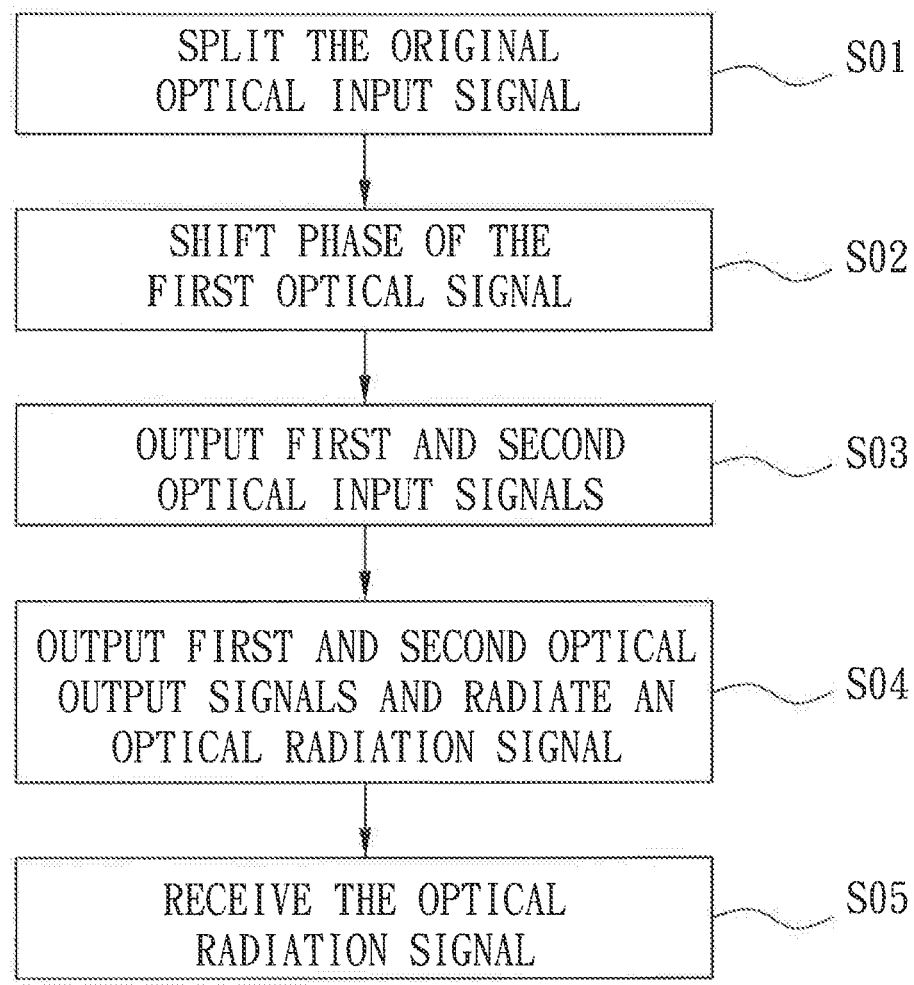
FIG. 2 is a flow chart of a preferred embodiment of a method of generating an optical radiation signal according to the present invention.

Referring to FIG. 2, the optical radiation signal generating device 1 is configured to implement a method of generating the optical radiation signal by shifting phase of the original optical input signal according to the present invention. The preferred embodiment of the method of the present invention includes the following steps.

In step S01, the optical splitter 21 of the dual-beam generating unit 2 is configured to receive the original optical input signal, which is converted from an electrical signal carrying information to be transceived, through the input terminal 211, to split the original optical input, signal into the first and second optical signals, and to output the first and second optical signals through the output terminals 212, respectively.

In step S02, the phase shifter 22 is configured to receive the first optical signal, and to shift the phase of the first optical signal according to the control signal so as to output the phase-shifted first optical signal.

Subsequently, in step S03, the optical circulators 23 are configured to receive the phase-shifted first optical signal and the second optical signal through the first ports 231, and to output the first and second optical input signals based on the phase-shifted first optical signal and the second optical signal through the second ports 232, respectively.

It is noted that each of the phase-shifted first optical signal and the second optical signal is a non-polarized signal, and is polarized into vertical and horizontal polarized components by the corresponding optical circulator 23. Then, the vertical and horizontal polarized components of each of the phase-shifted first optical signal and the second optical signal are rotated into rotated horizontal and vertical components due to Faraday effect, respectively. The rotated horizontal and vertical components of each of the phase-shifted first optical signal and the second optical signal are then recombined into a respective one of the first and second optical input signals that are outputted through the second ports 232.

In step 304, the second-order FBG 3 is configured to receive the first and second optical input signals respectively through the first and second ends 31, 32, and to radiate an optical radiation signal and generate the first and second optical output signals by interference between the first and second optical input signals. It is noted that the phase difference between the first and second optical input signals, which corresponds to the control signal, determines output powers of the first and second optical output signals and the optical radiation signal.

In step S05, the wireless receiver 42 is configured to receive the optical radiation signal. Finally, the optical radiation signal, can be converted, e.g., by Fourier transform, into basic waves that carry the transceived information.

Additionally, the optical circulators 23 are configured to receive the first and second optical output signals through the second ports 232 thereof, respectively. Each of the optical circulators 23 is further configured to output a corresponding one of the first and second optical output signals in a direction different from a direction of receipt of a corresponding one of the phase-shifted first optical signal and the second optical signal and different from a direction of receipt of the corresponding one of the first and second optical output signals. That is, the optical circulators 23 are configured to output the first and second optical output signals respectively through the third ports 233 thereof to respective power meters 41.

Figure 3:
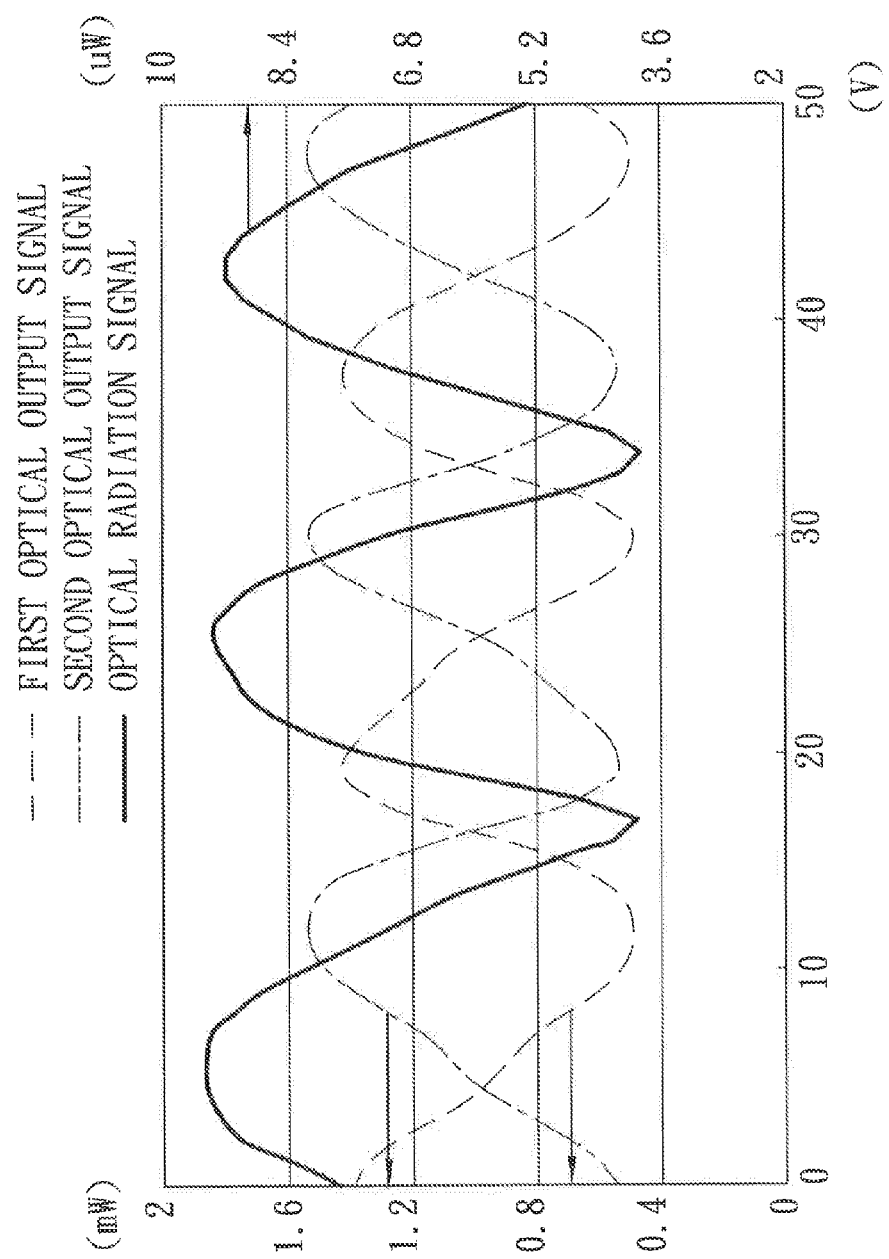
FIG. 3 is a plot illustrating experimental results of output power of first and second optical output signals and the optical radiation signal from an original optical input signal having a wavelength equal to a resonant wavelength of a second-order fiber Bragg grating (FBG)
Figure 4:
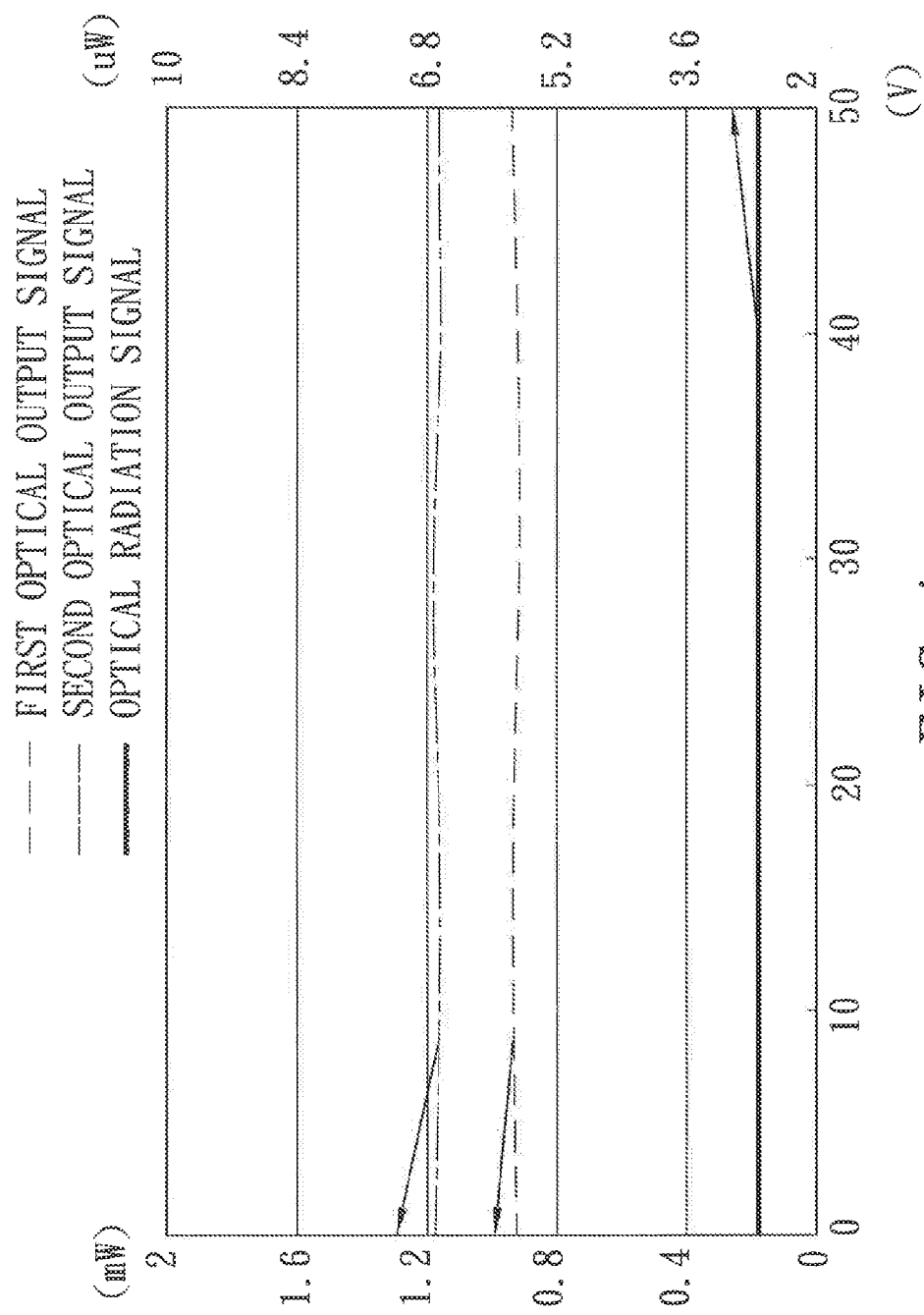
FIG. 4 as another plot similar to FIG. 3 in which the wavelength of the original, optical input signal is different from the resonant wavelength of the second-order FBG.

FIGS. 3 and 4 illustrate the cutout power of the first and second optical output signals and the optical radiation which are generated by the second-order FBG 3 having a resonant wavelength of 1539.3 nm, measured by the power meters 41 and the wireless receiver 42 when a DC voltage (i.e., the control signal) is applied to the phase shifter 22.

Referring to FIG. 3, a wavelength of the original optical input signal is equal to 1539.3 nm and the phase shifter 22 changes the phase of the first optical signal from 0 to $2\pi$ with the DC voltage varying from 0V to 20V. The output power of the optical radiation signal ranges from 916 μW to 3.85 μW when the DC voltage ranges from 6V to 17V. Note that the output powers of the first and second optical output signals and the optical radiation signal are periodically changed according to the DC voltage.

In a period where the phase difference between the first and second input optical signals varies from 0 to π (i.e., the DC voltage varies from 0 to about 10V), the output power of the first and second optical output signals are respectively 0.486 mW and 1.539 mW, which correspond respectively to a minimum value and a maximum value in the period.

In addition, in another period where the DC voltage varies from 20V to about 40V, the output power of the first and second optical output signals are respectively 0.538 mW and 1.408 mW, which correspond respectively to a minimum value and a maximum value in said another period.

By this way, the first and second optical output signals may serve as trigger signals for turning on and off peripheral electronic devices (not shown). Similarly, maximum and minimum values of the output power of the optical radiation signal may respectively serve as a trigger signal for wirelessly turning on and off a peripheral electronic device.

Referring to FIG. 4, when the original optical input signal having a wavelength equal to 1539.15 nm, which does not correspond to the resonant wavelength of the second order FBG 3, is provided to the optical radiation signal generating device 1, interference effect between the first and second optical input signals is weak. Consequently, the output powers of the first and second optical output signals and the optical radiation signal do not periodically change, and are almost constant.

To sum up, in the present invention, the original optical input signal is first transmitted to the dual-beam generating unit 2 using optical fibers, which provides a relatively reliable signal transmission, and the second-order FBG 3 generates the optical radiation signal according to the first and second optical input signals that have a phase difference corresponding to the control signal. Subsequently, the wireless receiver 42 (e.g. a power meter) can measure the output power of the optical radiation signal without wired-connection to the second-order FBG 3 since the optical radiation signal is radiated from the second-order FBG 3 and received by the wireless receiver 42 in a wireless manner. Thus, a physical connection between the wireless receiver 42 and the optical radiation signal generating device 1 is not required in the present invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method of generating an optical radiation signal, said method to be implemented by an optical radiation signal generating device that includes a dual-beam generating unit for receiving an original optical input signal and includes an optical splitter that has an input terminal and two output terminals, a phase shifter, and two optical circulators, and a second-order fiber Bragg grating (FBG) having opposite first and second ends, the method comprising the following steps of:

a) configuring the dual-beam generating unit to generate, from the original optical input signal, first and second optical input signals, which have a phase difference therebetween, according to a control signal; and b) configuring the second-order FBG to receive the first and second optical input signals, respectively, through the first and second ends thereof, to generate first and second optical output signals according to the first and second optical input signals, and to radiate an optical radiation signal, which is to be received by a wireless receiver, by interference between the first and second optical input signals:

wherein, in step a):

the optical splitter is configured to receive the original optical input signal through the input terminal, to split the original optical input signal into first and second optical signals, and to output the first and second optical signals through the output terminals, respectively;

the phase shifter is configured to receive the first optical signal and to shift phase of the first optical signal according to the control signal so as to output a phase-shifted first optical signal; and the optical circulators are configured to receive the phase-shifted first optical signal and the second optical signal, and to output the first and second optical input signals based on the phase-shifted first optical signal and the second optical signal, respectively; and wherein, in step b), the first and second optical output signals are emitted respectively from the first and second ends along an imaginary line extending from the first end to the second end, and the optical radiation signal is radiated in a radial direction perpendicular to the imaginary line.

2. The method as claimed in claim 1, wherein the first optical output signal consists of a reflected portion of the first optical input signal that is reflected by the second-order FBG and a transmitted portion of the second optical input signal that is transmitted through the second-order FBG, and the second optical output signal consists of a reflected portion of the second optical input signal that is reflected by the second-order FBG and a transmitted portion of the first optical input signal that is transmitted through the second-order FBG.

3. The method as claimed in claim 1, further comprising the following steps of:

c) configuring the optical circulators of the dual-beam generating unit to receive the first and second optical output signals, respectively; and d) configuring each of the optical circulators to output a corresponding one of the first and second optical output signals in a direction different from a direction of receipt of a corresponding one of the phase-shifted first optical signal and the second optical signal and different from a direction of receipt of the corresponding one of the first and second optical output signals.

4. An optical radiation signal generating device comprising:

a dual-beam generating unit for receiving an original optical input signal and a control signal, said dual-beam generating unit being operable to generate, from the original optical input signal, first and second optical input signals, which have a phase difference therebetween, according to the control signal; and a second-order fiber Bragg grating (FBG) connected to said dual-beam generating unit for receiving the first and second optical input signals, said second-order FBG being operable to radiate an optical radiation signal produced by interference between the first and second optical input signal;

wherein said dual-beam generating unit includes:

an optical splitter having an input terminal and two output terminals, and being operable to receive the original optical input signal through the input terminal, to split the original optical input signal into first and second optical signals, and to output the first and second optical signals through the output terminals, respectively;

a phase shifter being operable to receive the first optical signal, and to shift phase of the first optical signal according to the control signal so as to output a phase-shifted first optical signal; and two optical circulators being operable to receive the phase-shifted first optical signal and the second optical signal, and to output the first and second optical input signals based on the phase-shifted first optical signal and the second optical signal, respectively;

wherein said second-order FBG is further operable to generate first and second optical output signals according to the first and second optical input signals; and wherein said second-order FBG has opposite first and second ends, said second-order FBG being operable to receive the first and second optical input signals respectively through said first end and said second end, the first and second optical output signals being emitted respectively from said first end and said second end along an imaginary line extending from said first end to said second end, the optical radiation signal being radiated in a radial direction perpendicular to the imaginary line.

5. The optical radiation signal generating device as claimed in claim 4, wherein said optical circulators of said dual-beam generating unit are operable to receive the first and second optical output signals, respectively, and each of said optical circulators is operable to output a corresponding one of the first and second optical output signals in a direction different from a direction of receipt of a corresponding one of the phase-shifted first optical signal and the second optical signal and different from a direction of receipt of the corresponding one of the first and second optical output signals.

6. An optical radiation signal transceiving system comprising:

an optical radiation signal generating device that includes:
a dual-beam generating unit for receiving an original optical input signal and a control signal, said dual-beam generating unit being operable to generate, from the original optical input signal, first and second optical input signals, which have a phase difference therebetween, according to the control signal, and a second-order Fiber Bragg grating (FBG) connected to said dual-beam generating unit for receiving the first and second optical input signals, the first and second optical input signals interfering with each other to produce an optical radiation signal radiated by said second-order FBG; and a wireless receiver for receiving the optical radiation signal;

wherein said dual-beam generating unit includes:

an optical splitter having an input terminal and two output terminals, and being operable to receive the original optical input signal through the input terminal, to split the original optical input signal into first and second optical signals, and to output the first and second optical signals through the output terminals, respectively;

a phase shifter being operable to receive the first optical signal, and to shift phase of the first optical signal according to the control signal so as to output a phase-shifted first optical signal; and two optical circulators being operable to receive the phase-shifted first optical signal and the second optical signal, and to output the first and second optical input signals based on the phase-shifted first optical signal and the second optical signal, respectively;

wherein said second-order FBG is further operable to generate first and second optical output signals according to the first and second optical input signals; and wherein said second-order FBG has opposite first and second ends, said second-order FBG being operable to receive the first and second optical input signals respectively through said first and second ends thereof, the first and second optical output signals being emitted respectively from said first and second ends along an imaginary line extending from said first end to said second end, the optical radiation signal being radiated in a radial direction perpendicular to the imaginary line.

7. The optical radiation signal transceiving system as claimed in claim 6, wherein said optical circulators of said dual-beam generating unit are operable to receive the first and second optical output signals, respectively, and each of said optical circulators is operable to output a corresponding one of the first and second optical output signals in a direction different from a direction of receipt of a corresponding one of the phase-shifted first optical signal and the second optical signal and different from a direction of receipt of the corresponding one of the first and second optical output signals.

* * * * *